(12) United States Patent
Mahoney et al.

(10) Patent No.: US 7,452,401 B2
(45) Date of Patent: Nov. 18, 2008

(54) OXYGEN INJECTION METHOD

(75) Inventors: William John Mahoney, East Aurora, NY (US); Michael Francis Riley, Greenwood, IN (US); Adrian Christian Deneys, East Amherst, NY (US); Gary Thomas Vardian, Grand Island, NY (US); Stephen A. Manley, Hondo, TX (US)

(73) Assignee: Praxair Technology, Inc., Danbury, CT (US)

( * ) Notice: Subject to any disclaimer, the term of this patent is extended or adjusted under 35 U.S.C. 154(b) by 325 days.

(21) Appl. No.: 11/476,039

(22) Filed: Jun. 28, 2006

(65) Prior Publication Data

US 2008/0000325 A1 Jan. 3, 2008

(51) Int. Cl.
*C21C 5/30* (2006.01)
*C21B 7/16* (2006.01)

(52) U.S. Cl. ............... 75/528; 75/529; 75/530; 266/47

(58) Field of Classification Search ........... 75/528–530; 266/47, 267, 268
See application file for complete search history.

(56) References Cited

U.S. PATENT DOCUMENTS

| | | | | |
|---|---|---|---|---|
| 3,427,151 A | | 2/1969 | Koudelka et al. ............... 75/59 |
| 4,622,007 A | * | 11/1986 | Gitman ........................ 432/13 |
| 5,413,623 A | * | 5/1995 | Oonuki et al. ................ 75/508 |
| 5,599,375 A | | 2/1997 | Gitman ...................... 75/10.42 |
| 5,788,921 A | | 8/1998 | Gitman et al. ............... 266/225 |
| 5,814,125 A | | 9/1998 | Anderson et al. ............. 75/414 |
| 5,858,302 A | | 1/1999 | Gitman et al. ............... 266/182 |
| 5,927,960 A | | 7/1999 | Felderman ................... 431/158 |
| 5,931,985 A | | 8/1999 | Schoeler et al. .............. 75/414 |
| 5,944,507 A | * | 8/1999 | Feldermann ................ 431/189 |
| 6,096,261 A | | 8/2000 | Anderson et al. ........... 266/225 |
| 6,125,133 A | | 9/2000 | Mathur et al. .................. 373/8 |
| 6,142,764 A | | 11/2000 | Anderson et al. .............. 431/8 |
| 6,171,544 B1 | | 1/2001 | Anderson et al. ............. 266/47 |
| 6,176,894 B1 | | 1/2001 | Anderson et al. ............. 75/414 |
| 6,261,338 B1 | | 7/2001 | Mahoney et al. .............. 75/414 |

(Continued)

FOREIGN PATENT DOCUMENTS

GB 1371978 10/1974

(Continued)

*Primary Examiner*—Roy King
*Assistant Examiner*—Tima M McGuthry-Banks
(74) *Attorney, Agent, or Firm*—Steven T. Trinker

(57) ABSTRACT

A method of injecting oxygen into a melt located within a metallurgical furnace having a heated furnace atmosphere in which oxygen and fuel is injected into 1 or more nozzles having passageways of converging-diverging configuration under choked flow conditions to produce supersonic jet or jets discharged from the passageways. Fuel is injected into internal circumferential locations of the passageways so as to impart a structure to the jets being discharged that have an outer circumferential region containing a mixture of fuel and oxygen and a central region containing essentially oxygen. Such a structured jet upon discharge interacts with the furnace atmosphere to create an outer shear-mixing zone in which the outer circumferential layer mixes with the heated furnace atmosphere and auto-ignites to produce a flame envelope surrounding a supersonic jet of oxygen. The jet of oxygen and flame envelope can be directed against a melt contained within the metallurgical furnace for injection of oxygen into the melt.

17 Claims, 10 Drawing Sheets

U.S. PATENT DOCUMENTS

| | | | |
|---|---|---|---|
| 6,322,610 B1 | 11/2001 | Pavlicevic et al. | 75/554 |
| 6,383,445 B1 | 5/2002 | Anderson et al. | 266/225 |
| 6,450,799 B1 | 9/2002 | Mahoney et al. | 431/8 |
| 6,514,310 B2 | 2/2003 | Allemand et al. | |
| 6,604,937 B1 | 8/2003 | Mahoney | 431/8 |
| 6,773,484 B2 | 8/2004 | Mahoney et al. | 75/414 |

FOREIGN PATENT DOCUMENTS

| | | |
|---|---|---|
| JP | 10009524 | 1/1988 |
| JP | 08075364 | 3/1996 |
| JP | 10030110 | 2/1998 |
| JP | 10259413 | 9/1998 |
| JP | 2002288115 | 7/2003 |
| WO | WO 2008076901 A1 * | 6/2008 |

* cited by examiner

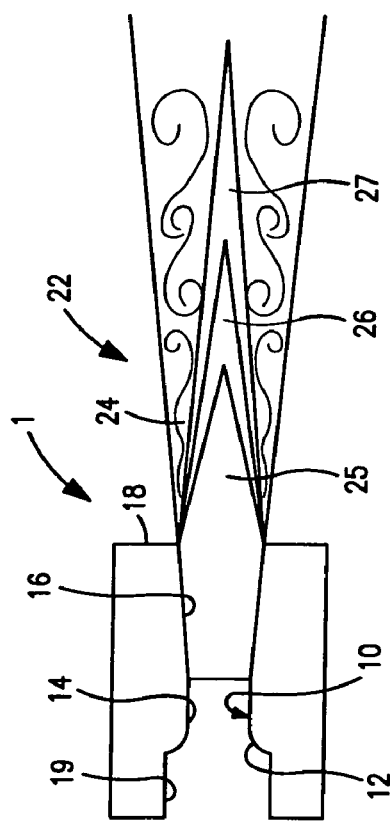
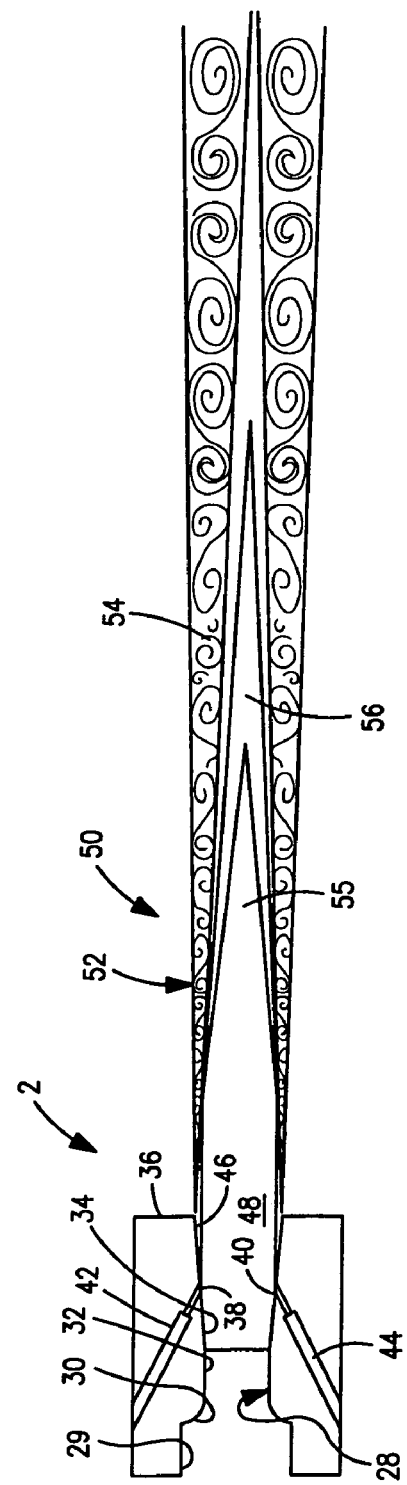
FIG. 1
FIG. 2

OXYGEN INJECTION METHOD

FIELD OF THE INVENTION

The present invention relates to a method of injecting a supersonic jet of oxygen into a melt located within a metallurgical furnace in which a jet of oxygen is discharged from a convergent-divergent passageway of a nozzle at a supersonic velocity as part of a structured jet having an outer circumferential region composed of a mixture of fuel and oxygen that auto-ignites and combusts in the furnace atmosphere and not within the nozzle to form a flame envelope to inhibit velocity decay and concentration decay of the jet of oxygen.

BACKGROUND OF THE INVENTION

Oxygen is typically injected into molten metal baths for such purposes as the refining of steel. For example, steel is refined in electric arc furnaces (EAF) and basic oxygen furnaces (BOF) by injecting oxygen into a melt that contains iron and scrap. The injection of oxygen reacts with carbon, silicon, manganese, iron and impurities that include phosphorus to adjust the carbon content of the melt and to remove the impurities. The oxidation reactions produce a slag layer over the top of the melt. Oxygen is injected for other purposes, for example, copper, lead and zinc for smelting purposes.

It is important that oxygen penetrate the molten metal bath. In the BOF, excessive oxygen reaction in the slag layer causes uncontrolled foaming, leading to the wasteful ejection of material from the converter, a phenomenon called "slopping". In the EAF, poor oxygen penetration can result in unwanted oxidation of the carbon electrodes, resulting in increased operating costs. Additionally, deep penetration of the oxygen, from a metallurgical lance, will produce a beneficial stirring action of the molten metal.

In order to achieve deep penetration, metallurgical lances have been placed close to the surface of the melt as possible. A problem with this is that the service life of the lance becomes very short due to the intense heat generated at the surface of the molten metal. Another problem is the enhanced risk of releasing water coolant into the furnace, which can result in violent and dangerous reactions with the melt, due to overheating of the lance. Also, deposits form on the molten metal lance that decrease its service life. Another detrimental effect is that molten metal and slag can splash resulting in a loss of product and furnace maintenance problems.

In order to avoid placing the metallurgical lance close to the surface of the melt, it is desirable that the oxygen be discharged from the metallurgical lance with as high a velocity as possible so that the oxygen may penetrate the molten metal while at the same time the lance may be positioned at a distance above the melt. However, when an oxygen jet is discharged from the metallurgical lance, the jet will interact with the furnace atmosphere. Such interaction causes a decay in the velocity and concentration of the oxygen jet and a consequent decrease in the ability of the oxygen jet to penetrate the molten metal bath.

In order to overcome this problem, it has been known to provide a flame envelope or shroud that envelops the oxygen jet to inhibit velocity decay. For example, in U.S. Pat. No. 3,427,151, oxygen is introduced into a nozzle that is provided with a central passageway having a constriction to achieve a sonic velocity at the constriction and a sonic velocity of the oxygen jet being discharged from the nozzle. Supplementary oxygen and fuel is ejected from concentric rings of oxygen passageways and fuel passageways that surround the central passageway to produce the flame envelope that surrounds the central oxygen jet.

U.S. Pat. No. 5,599,375 discloses a burner/injector having a central converging-diverging passageway to inject oxygen into a combustion chamber. Surrounding the converging-diverging passageway are fuel passages to inject fuel in the combustion chamber. Surrounding the fuel passages are secondary oxygen passages to introduce a second oxidizing gas into the combustion chamber. When the burner injector operates in a fuel burning mode, the fuel is combusted within the combustion chamber together with centrally injected oxygen and the second oxidizing gas. This creates a scrap heating and melting flame directed through the combustion chamber towards the scrap to be melted. Once a small portion of the scrap is melted, the flow of the fuel is reduced and the flow of oxygen is increased to create a highly oxidizing flame that rapidly reacts with preheated scrap to melt additional scrap by heat released from the exothermic oxidation. The fuel flow is then further reduced or completely eliminated and the flow of the oxygen discharged from the converging-diverging nozzle is further substantially increased, preferably to a supersonic velocity, to react with an additional portion of the preheated scrap located further away from the burner/injector.

As can be appreciated, U.S. Pat. No. 3,427,151 having only a constricted passageway and not a converging-diverging passageway is incapable of projecting a supersonic jet of oxygen. While U.S. Pat. No. 5,599,375 utilizes a converging-diverging passageway to produce a supersonic jet of oxygen, no flame envelope is employed because little or no fuel is injected and therefore, the supersonic jet of oxygen rapidly will decay due to interaction of the jet with the furnace atmosphere.

In order to solve these problems, U.S. Pat. No. 5,814,125 provides a method of injecting a gas into liquid melt such as molten iron. In accordance with the method, a supersonic jet of oxygen is created within a nozzle having converging-diverging passageway. The supersonic jet of oxygen is surrounded by a flame envelope that is produced by ejecting fuel and oxygen from an inner and outer concentric arrangement of passages surrounding the central converging-diverging passageway. The flame shroud inhibits velocity decay of the supersonic jet of oxygen and allows the oxygen to impact the surface of the liquid melt at distances of 20 nozzle diameters or greater with a supersonic velocity. In U.S. Pat. No. 6,604, 937, a gas such as oxygen can be passed through a plurality of outwardly angled converging-diverging nozzles to produce jets having a supersonic velocity for injection into molten metal for refining purposes. Surrounding the converging-diverging nozzles are a ring of ports for alternately ejecting fuel and an oxidant to support combustion of the fuel. Such combustion produces a single flame envelope to surround the jets and thereby to inhibit velocity decay of the jets.

Even when a flame shrouded supersonic jet of oxygen is ejected from an injector or lance, such as described above in U.S. Pat. Nos. 5,814,125 and 6,604,937, molten metal and slag can form deposits known as skull that can clog the openings of passages from which fuel and oxygen are ejected. Such accretion can interfere with the formation of the flame shroud and thereby degrade the utility of the jet or render it ineffective. In order to solve this problem, published Japanese patent application 2002-288,115 discloses a water-cooled lance assembly having a converging-diverging passageway to eject a supersonic jet of oxygen from the lance tip. The supersonic jet of oxygen is surrounded by a flame produced within the central converging-diverging passageway by the internal injection of fuel within the passageway that is combusted within the passageway. In order to stabilize the flame, a straight section of the nozzle that communicates between the end of the diverging section of the passageway and the face of the nozzle is provided with a circumferential groove in which fuel and oxygen collects, decelerates and is combusted upon ignition.

Potential safety and operational problems can arise from the combustion occurring within the nozzle. The combustion of fuel is an exothermic oxidizing reaction that can degrade the nozzle itself to cause eventual or rapid, catastrophic failure. Such degradations can negatively impact lance lifetime and raise the risk of releasing water coolant into the furnace, which can react violently with the melt. There are safety hazards associated with the mixing of the hydrocarbons and oxygen within a confined space in that a combustible, if not explosive, mixture can be created. Those skilled in the art will appreciate the difficulties associated with the requisite ignition, combustion stabilization and flame supervision procedures.

As will be discussed, the present invention provides a method of injecting supersonic jets of oxygen into molten metal is superior to the prior art and in fact minimizes if not eliminates the problems identified in prior art devices discussed above.

SUMMARY OF THE INVENTION

The present invention provides a method of injecting oxygen into melt located within a metallurgical furnace having a heated furnace atmosphere.

In accordance with the method, an oxygen stream is introduced into a nozzle having a passageway of converging-diverging configuration. It is to be noted that the entire passageway does not have to have a converging-diverging configuration and in fact a passageway in accordance with the present invention can have a converging-diverging configuration portion followed by a straight cylindrical portion extending to the face of the nozzle. Furthermore the term "oxygen stream" as used herein and in the claims encompasses uniformly blended streams having an oxygen purity of at least about 35 percent by volume, remainder an inert gas such as argon. However, in oxygen steelmaking oxygen concentrations of about 90 percent and above are preferred. A fuel containing a hydrogen species is injected into the oxygen stream at inner circumferential locations of the passageway that are situated entirely within the passageway. In this regard, the term "hydrogen species" means molecular hydrogen or a molecule containing hydrogen or any substance containing hydrogen atoms or combinations thereof. As a result, a combined fuel and oxygen containing stream is formed within the passageway having a structure composed of an outer circumferential region containing a mixture of the oxygen and the fuel and an inner central region surrounded by the outer circumferential region and containing the oxygen and essentially no fuel.

The oxygen stream is introduced into an inlet section of the passageway at or above a critical pressure. As a result, a choked flow condition is established within a central throat section of the passageway, the combined fuel and the oxygen containing stream is accelerated to a supersonic velocity within a diverging section of the passageway and the combined fuel and oxygen containing stream is discharged as a structured jet from the nozzle into the furnace atmosphere. The structured jet has the structure of the combined fuel and oxygen containing stream and the supersonic velocity upon discharge from the nozzle.

Ignition and combustion of the fuel while within the passageway is prevented by not introducing an ignition source and providing the passageway with an inner surface uninterrupted by any discontinuity within which the outer circumferential region could otherwise decelerate and provide a site for stable combustion of the fuel.

A flame envelope is produced that surrounds a jet of oxygen formed from the inner central region of the structured jet and that initially has the supersonic velocity. The flame envelope inhibits velocity decay and concentration decay of the jet of oxygen. Velocity would otherwise decay without the flame envelope due to interaction of the jet of oxygen with the furnace atmosphere. Such interaction also causes a dilution of the jet of oxygen to produce a concentration decay. As used herein and in the claims, the term "flame envelope" means a flame that surrounds the jet of oxygen and propagates along the length thereof by active combustion of the fuel and any reactants that may be present within the heated furnace atmosphere, wherein such combustion is supported in whole or in part by oxygen supplied by the jet of oxygen. In the present invention, the flame envelope is produced entirely outside of the nozzle through contact of the outer circumferential region of the structured jet with the heated furnace atmosphere. This contact creates a shear-mixing zone containing a flammable mixture composed of the fuel, the oxygen and the heated furnace atmosphere and auto-ignition of the flammable mixture through heat supplied by the heated furnace atmosphere.

The jet of oxygen is directed into the melt, while surrounded by the flame envelope. In this regard, the term "melt" as used herein and in the claims with respect to a steelmaking furnace, EAF or BOF, means both the slag layer and the underlying molten pool of metal. As a result, in such furnace, the jet of oxygen would first enter the slag layer. In case of a metallurgic furnace in which a slag layer is not produced, the "melt" at which the jet of oxygen enters would constitute the molten metal. An example of this would be a non-ferrous refining vessel.

Although not known in the prior art, a discharge of a structured jet, such as described above, when contacted by the heated furnace atmosphere will produce a region within an outer shear-mixing zone that will ignite to form a flame envelope that will surround and inhibit velocity decay and concentration decay of a supersonic jet of oxygen formed by the inner central region of the structured jet. This allows a nozzle of the present invention to be positioned at some distance away from the melt and allows the beneficial stirring action of the melt to be enhanced.

As indicated above and as known in the prior art, the production and injection of a jet of oxygen while at a supersonic velocity has the advantage of maximizing the amount of oxygen that can react with oxidizable species contained within the melt for refining purposes while at the same time producing a vigorous stirring action of the melt. Additionally, there are no external fuel passages that can plug requiring removal of the lance from service and extraction of deposits, known as skull, from the face of the nozzle. Furthermore, as can be appreciated from the above discussion, the disadvantages of mixing, igniting and combusting an oxygen and fuel containing stream within a combined space are avoided by the present invention because ignition and combustion of the mixture of fuel and oxygen is prevented while within the nozzle.

The combined fuel and oxygen containing stream can be fully expanded upon discharge thereof as the structured jet from the nozzle. The fuel can be introduced to oxygen stream while within the diverging section of the nozzle. As a safety measure, the combined fuel and oxygen containing stream can be over expanded upon the discharge thereof as the structured jet from the nozzle such that the oxygen stream has a sub-ambient pressure while within the diverging section of the nozzle. The fuel can be introduced into oxygen stream at a location within the diverging section at which the oxygen stream is at the sub-ambient pressure. As a result, upon failure of the fuel supply system, oxygen will not back-flow through fuel passages creating a potential dangerous condition. Another beneficial result is the fuel delivery system is not required to overcome positive oxygen back-pressure, thereby minimizing the supply pressure required for fuel delivery into the nozzle.

The diverging section of the nozzle can extend from the central throat section to a nozzle face of the nozzle exposed to the heated furnace atmosphere. Other possibilities will become apparent from the detailed discussion below.

Preferably, the supersonic velocity of the structured jet of combined fuel and oxygen is at least about Mach 1.7.

The metallurgical furnace can be an electric arc furnace. In such case the fuel is preferably introduced into the oxygen stream at an equivalence ratio of between about 0.02 and about 0.14. Alternatively, the metallurgical furnace can be a basic oxygen furnace. In such case, the fuel is preferably introduced into the oxygen stream at an equivalence ratio of between about 0.01 and about 0.06. In either type of furnace, the heated furnace atmosphere will contain carbon monoxide and the flammable mixture used in forming the flame envelope will in turn contain the carbon monoxide. Where the metallurgical furnace is a basic oxygen furnace, the nozzle can be mounted in a water-cooled lance at a lance tip of the water-cooled lance. It is understood, however, that the application of the present invention is not limited to such furnaces and in fact can be used in a furnace having a heated furnace atmosphere that contains no carbon monoxide or any other substance that can serve as part of the flammable mixture used in forming the flame envelope. All that is necessary with respect to the "heated furnace atmosphere" is that it be of sufficient temperature to cause auto-ignition of the flammable mixture.

In any embodiment of the present invention, the fuel can be introduced into the oxygen stream at the inner circumferential locations of the passageway by injecting the fuel into a porous metal annular element having an inner annular surface. The inner annular surface forms part of the throat section or the diverging section of the converging-diverging passageway.

In a further aspect of a method of the present invention applied to injecting oxygen into melt located within a metallurgical furnace having a heated furnace atmosphere containing carbon monoxide, oxygen streams can be introduced into nozzles having passageways of converging-diverging configuration wherein the nozzles are situated at a tip of a water-cooled lance and angled outwardly from a central axis of the water-cooled lance. Such metallurgical furnace can be a basic oxygen furnace. The fuel containing a hydrogen species is injected into the oxygen streams in the manner outlined above to form structured jets, flame envelopes and individual jets of oxygen, which initially have a supersonic velocity. The water-cooled lance can be situated within the basic oxygen furnace and the jets of oxygen are directed into the melt.

In basic oxygen furnace lances, there are typically between 3 and 6 nozzles and the nozzles are outwardly angled at between about 6 degrees and about 20 degrees from the central axis. As indicated above, in case of a basic oxygen furnace, the fuel can be introduced into the oxygen streams at an equivalence ratio of between about 0.01 and about 0.06 and the supersonic velocity of each of the structured jets of combined fuel and oxygen can be at least about Mach 1.7. In a specific embodiment, the fuel can be introduced into a fuel chamber and the nozzles are positioned to pass through the fuel chamber. The fuel is introduced into the passageways through fuel passages located within the lance tip and communicating between the inner circumferential locations of the passageways and the fuel chamber. In this regard, there can be between about 4 and about 12 fuel passages for each of the passageways. It is to be noted that more or less fuel passages can be used.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

FIG. 1 is a schematic, cross-sectional view of a nozzle producing a free jet of oxygen in accordance with a method of the prior art;

FIG. 2 is a schematic, cross-sectional view of a nozzle to conduct a method in accordance with the present invention;

DETAILED DESCRIPTION

Figure 3:
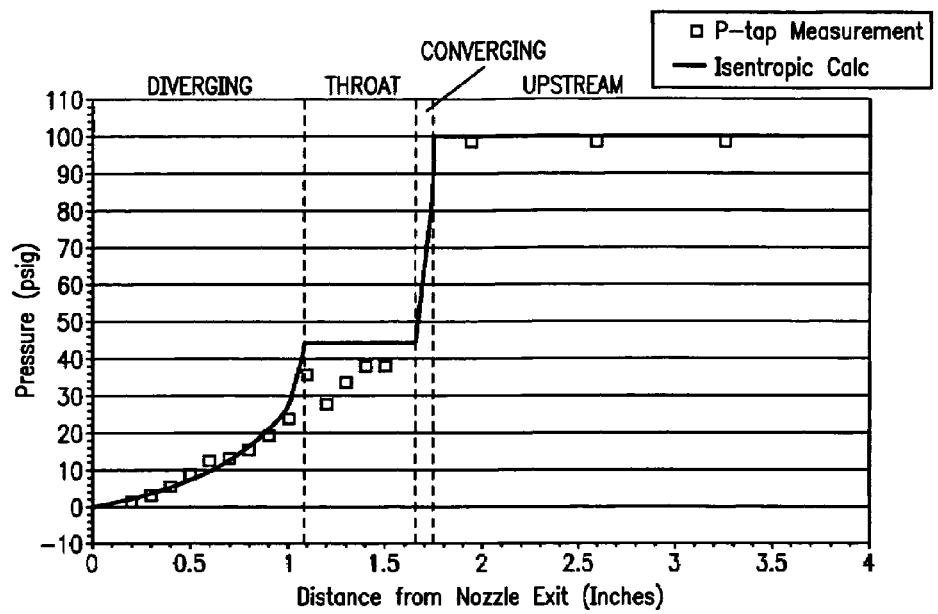
FIG. 3 is a graphical representation of the axial static pressure distribution that is developed within a converging-diverging passageway in which the internal stream is fully expanded upon exit from the nozzle.

With reference to FIGS. 1 and 2, the operation of a prior art nozzle 1 that is used to inject a supersonic jet of oxygen into a metallurgical furnace is compared with the operation of a nozzle 2 in accordance with the present invention.

Nozzle 1 has a passageway 10 of converging-diverging configuration that includes a converging inlet section 12, a central throat section 14 and a diverging outlet section 16 that terminates at a nozzle face 18. When an oxygen stream is injected from a supply passageway 19 into converging inlet section 12 of passageway 10, it undergoes an initial expansion. If the pressure of the oxygen is above what is referred to in the art as "critical pressure" or a "Mach 1 expansion pressure" of the oxygen stream being introduced into nozzle 10, a choked flow condition is achieved in central throat section 14 in which the oxygen has achieved a sonic velocity. The term "sonic velocity" as used herein and in the claims means a velocity that has a magnitude of the speed of sound. Under a choked flow condition, any increase in pressure will not increase the speed of the oxygen within central throat section 14. Within the diverging outlet section 16 of nozzle 10, the flow of oxygen becomes supersonic as the oxygen further expands in such section. As mentioned above, while increasing the pressure of the oxygen upstream of the converging inlet section 12 of the nozzle will not increase the velocity of the oxygen within the throat section 14, such pressure increase will increase the velocity within the diverging outlet section 16 of nozzle 10.

At the nozzle face 18, a jet of oxygen 22 is discharged from nozzle 10 into a high temperature furnace atmosphere that is normally slightly above atmospheric pressure. In case of a basic oxygen furnace, such pressure is, generally about 25 percent higher than atmospheric pressure. Upon discharge from the nozzle face 18, the jet of oxygen 22 initially has a supersonic velocity.

In a furnace that is used in the processing of steel, the furnace atmosphere contains a high concentration of carbon monoxide due to reaction of the oxygen with carbon contained within the melt. As the jet of oxygen 22 extends outwardly from nozzle face 18, the outer circumferential region thereof will tend to interact with the furnace atmosphere in what is referred to as a shear-mixing zone 24 in which the furnace atmosphere mixes with the oxygen contained in the jet of oxygen 22 by formation of micro-vortices. While there can be combustion of carbon monoxide in the furnace atmosphere in the shear-mixing zone 24, the rate of combustion of carbon monoxide is at a sufficiently low rate and is ineffective at forming a flame envelope in the manner discussed above. In fact, significant combustion will only occur at a distance from the nozzle face 18 that is typically beyond 6 nozzle diameters from the nozzle face 18. This spacing of the combustion makes any flame surrounding the jet of oxygen 22 ineffective to prevent velocity decay and concentration decay of the jet of oxygen 22 in a manner contemplated by the present invention.

The mixing of the oxygen and the furnace atmosphere that occurs within shear-mixing zone 24 increases along the length of the jet of oxygen 22 as viewed from the nozzle face 18 to produce a conical region 25 in which the flow is unaffected by the mixing process and in fact has the same properties as those existing at the nozzle face 18. In the art, this region is referred to as a potential core. The region of flow beyond the potential core 25 is the point at which the velocity of the supersonic jet of oxygen 22 first starts to decrease below its velocity at the nozzle face 18. Those in the art will recognize the existence of a supersonic core 26 that extends beyond and includes the potential core 25, in which at all points the flow velocity is greater than or equal to Mach 1. Beyond the supersonic core, the flow velocity is subsonic at all points 27. As the shear-mixing and reaction zone eventually reaches the jet axis, the transition to a fully developed turbulent and combusting jet occurs.

With reference to FIG. 2, a nozzle 2 is illustrated that is designed to conduct a method in accordance with the present invention. Nozzle 2 includes a converging-diverging passageway 28 in which an oxygen stream is introduced from a supply passageway 29 into a converging inlet section 30 to achieve sonic velocity within a central throat section 32 under the choked flow conditions. Supersonic velocities are achieved within a diverging outlet section 34 that extends from central throat section 32 and terminates at nozzle face 36.

Fuel is injected at inner circumferential locations 38 and 40 of the diverging outlet section 34 by way of fuel passages 42 and 44. As would be understood by those skilled in the art, the fuel passages 42 and 44 and thus, the inner circumferential locations of injection would be placed at regular intervals within diverging outlet section 26. For example, if 4 points of injection were desired, there would be 4 circumferential locations, such as 38 or 40 spaced 90 degrees from one another as viewed in a transverse direction. This being said, the circumferential locations, such as 38 or 40 do not have to lie in the same axial plane. They could be staggered.

The injection of fuel produces a combined fuel and oxygen containing stream within converging-diverging passageway 28 that continues to accelerate from the points of injection, namely, inner circumferential locations 38 and 40, as the flow continues to expand within diverging outlet section 34. Given the choked flow conditions, the oxygen jet, prior to the injection of the fuel, will have a supersonic velocity and the combined fuel and oxygen containing stream will accelerate further to higher supersonic velocities as the flow progresses towards the nozzle face 36.

The injection of the fuel at the circumferential locations, for example, 38 and 40, imparts a structure to the combined oxygen and fuel containing stream within nozzle 2 that has an outer circumferential region 46 and an inner central region 48. The outer circumferential region is composed of a mixture of the oxygen and the fuel. The inner central region 48 is composed of the oxygen and contains essentially no fuel.

It is to be noted that although the circumferential locations, for example, 38 and 40, are illustrated as being located within the diverging outlet section 34, they could also be located within the throat section 32 or even converging inlet section 30. For practical and safety reasons, the preferred fuel injector location is in the diverging outlet section 34. However, the invention would be effective if the fuel injectors were placed around the oxygen upstream of the entrance to converging-diverging nozzle. However, such placement would be disadvantageous for safety and fuel pressure limitations.

Unlike the prior art, there is no ignition and combustion that occurs within nozzle 2. However, a danger exists of such combustion due to the high temperatures of the furnace and the fact that the oxygen and fuel are being mixed within a very confined space. Hence, as indicated above, the safest course is to inject the fuel at the point where low temperatures and high velocities are achieved due to the expansion of the flow. Consequently, the safest points of injection of the fuel will be in the diverging outlet section 34 because the lowest temperatures and highest velocities are achieved in such section due to the expansion of the oxygen and the continued expansion of the combined fuel and oxygen containing stream.

At the nozzle face 36, the combined fuel and oxygen containing stream is discharged as a structured jet 50 that has the same structure as the combined oxygen and fuel containing stream flowing within converging-diverging passageway 28 of nozzle 2. As in the free jet produced by nozzle 1, the outer circumferential region of the structured jet 50 will begin to interact with the heated furnace atmosphere to form a shear-mixing zone 52 in which the fuel, the oxygen and the heated furnace atmosphere will mix. This mixing together with the heat provided by the heated furnace atmosphere will cause auto-ignition and a subsequent flame envelope 54 to project from the nozzle face 36. Due to the ignition, shear-mixing zone 52 will also contain heated combustion products. It is to be noted that flame envelope 54 need not be attached to the nozzle face 36 to be effective. Flame envelope 54 must, however, form at least in close proximity to nozzle face 36, for example, within about 1 and about 2 nozzle diameters. As pointed out above, the furnace atmosphere does not have to contain carbon monoxide or any other substance that would react to produce a flame. All it need have is the temperature to cause auto-ignition.

The flame envelope 54 will act to inhibit velocity and concentration decay of the jet of oxygen 56 that is formed from the inner central region 48 of the combined fuel and oxygen containing stream. In case of nozzle 2, the flame envelope extends from nozzle face 36 or at least in close proximity thereof due to the fact that the fuel utilized in forming flame envelope 54 contains a hydrogen species that reacts much faster than a fuel such as carbon monoxide alone that may be present in the heated furnace atmosphere. Typical gaseous fuels can be hydrogen, natural gas, methane, propane, petroleum gas, coke oven gas, synthesis gas, acetylene or a vaporized and/or pyrolyzed liquid or gaseous fuel, or mixtures thereof with inert gas and/or carbon monoxide. Typical liquid fuels can be hydrocarbon fuel oils, kerosene or gasoline that has been pre-atomized into a gas or vapor containing fuel droplets, or atomized by the action of the oxygen stream itself. Other gaseous and liquid hydrogen containing non-hydrocarbon fuels can also be suitable for use in this invention and include alcohol and ammonia as examples.

As compared to the jet produced by nozzle 1, the potential and supersonic cores 55 and 56 produced by nozzle 2 are much longer and thus, a jet of oxygen formed in a manner in accordance with the present invention will allow the nozzle 2 to be placed at a greater distance from the surface of the melt and to increase the rate of agitation of the melt than is possible with use of oxygen injection alone. At the same time, since there are no further openings in the nozzle face 36 from which fuel and oxygen is injected, there is no potential for clogging such openings.

As mentioned above, there is no combustion occurring within nozzle 2. As illustrated, downstream of the inner circumferential locations 38 and 40, there are no discontinuities in the inner surface of the outlet section 34 that would tend to decelerate the mixture of fuel and oxygen contained within the combined oxygen and fuel containing stream that would provide a site for stable combustion of the fuel to occur if the mixture was ignited. In this regard, a deceleration of the combined fuel and oxygen containing stream will cause circulation to occur by way of vortices and therefore further mixing of the fuel and the oxygen and a potential for combustion of the mixture.

The potential for ignition of the fuel and the oxygen exists when the oxygen flow rate is decreased such that nozzle 2 is said to be under-blown. This situation can arise during upset conditions caused by a failure of the oxygen supply or under other circumstances in which the flow of the oxygen is purposefully reduced during a refining process. As a result of the reduction in the oxygen flow rate, a separation of the flow of the combined fuel and oxygen containing stream from the inner surface of converging-diverging passageway 28 can occur. This will result in a gap to provide a space for the heated furnace atmosphere to enter nozzle 2, mix with the fuel and oxygen and provide sufficient heat to ignite the mixture. This under-blown condition also produces an over expanded jet which as will be discussed below may be beneficial. However, even when the above process occurs, there is no site at which to stabilize the flame within the nozzle due to the lack of inner surface discontinuities within the nozzle such as the groove utilized in the prior art to stabilize a flame.

Figure 4:
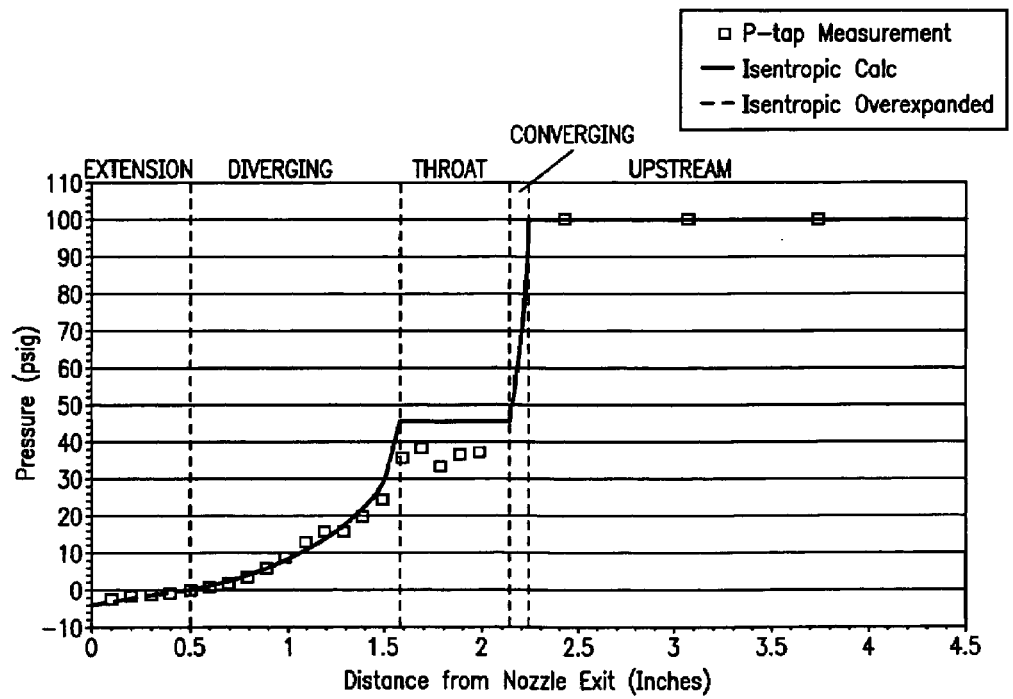
FIG. 4 is a graphical representation of the axial static pressure distribution within a converging-diverging passageway in which diverging outlet section is designed so that the oxygen is expelled from the nozzle in an over expanded state.

With reference to FIG. 3, an experimentally derived static pressure distribution within a converging-diverging nozzle is shown in which the stream exiting the nozzle is fully expanded. The measurements were obtained from a converging-diverging nozzle with an exit diameter of 0.81 in. and a throat diameter of 0.62 in. The nozzle was designed to admit about 36,000 scfh when supplied with a pressure of about 100 psig and whereupon the oxygen jet, exhausted into ambient air, exits the nozzle fully expanded at Mach 2 and 1,600 fps. The term "fully expanded" as used herein and in the claims means that the stream discharged from the nozzle has an internal static pressure that is about equal to that of the ambient pressure in a metallurgical furnace. With reference to FIG. 4, an experimentally derived static pressure distribution is shown in which the jet exiting the nozzle is over expanded. The term "over expanded" as used herein and in the claims means that the jet exiting the nozzle has a lower internal static pressure than the furnace ambient atmosphere. Even though the internal static pressure of the jet has been reduced, the jet exiting the nozzle remains supersonic. Whether a jet exiting a nozzle is fully expanded or over expanded will depend upon the design of the nozzle and the pressure differential between the oxygen supplied and the furnace atmosphere. In the over expanded case shown in FIG. 4, the length of the diverging section was increased by provision of an extension onto the aforementioned nozzle and the exit diameter increased to 0.89-in. Such design considerations are well known to those skilled in the art.

Figure 5:
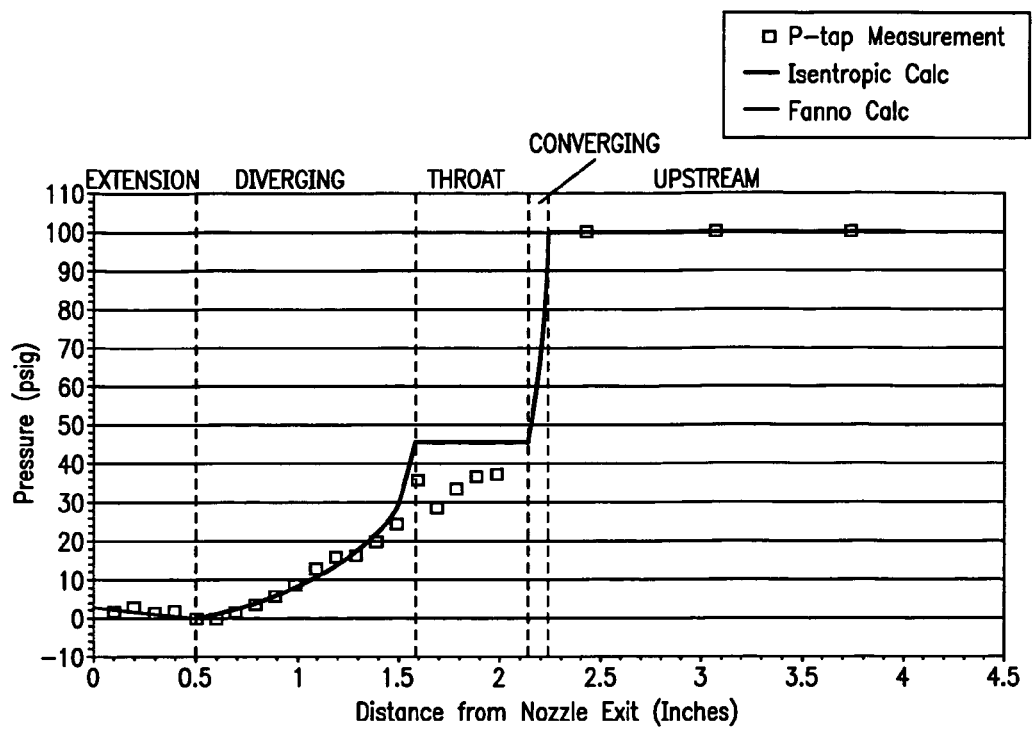
FIG. 5 is a graphical representation of the axial static pressure distribution within a converging-diverging passageway that employs a cylindrical extension that extends to the outlet section to the nozzle face so that the oxygen is expelled from the nozzle in an under expanded state.

With reference to FIG. 5, the passageway of the nozzle illustrated in FIG. 2 is provided with a cylindrical extension that extends from the diverging outlet section to the nozzle face. The effect of the extension is to increase the static pressure of the stream discharged from the nozzle at the nozzle face. Since the internal static pressure of the flow within the nozzle illustrated in FIG. 5 is above the pressure within the furnace atmosphere, the jet being expelled is said to be under expanded. The invention could be practiced with the use of such an under expanded jet.

As is evident from the figures, the correspondence between the isentropic calculations (not taking frictional effects into account), Fanno calculations (FIG. 5 taking frictional effects into account for supersonic flow) and the actual pressure measurements given by "P-tap Measurement" is very close. The addition of fuel to produce a structured jet, such as structured jet 50, would have little effect on the calculated and actual results illustrated in the figures. Therefore, a nozzle in accordance with the present invention could be designed to produce a structured jet that is either fully expanded, over expanded or under expanded and may incorporate cylindrical or conical extensions to the diverging section so as to form under expanded and over expanded streams, respectively.

The over expanded case shown in FIG. 4 can be employed such that the oxygen stream and the combined fuel and oxygen containing stream can have a sub-ambient pressure at locations within a diverging outlet section of a converging-diverging passageway of a nozzle. The diverging outlet section 34 of nozzle 2 could be designed to provide an over expanded structured jet. The advantage of such an embodiment is that the circumferential locations can be placed at such a sub-ambient location so that if, for any reason, there exists an interruption of the fuel supplied due to an equipment failure, the oxygen stream will not enter passageways 42 and 44 to create the potential for combustion outside of the nozzle and within the equipment utilized for supplying the fuel at pressure. Another advantage of this embodiment is the fuel supply source is not required to overcome a positive oxygen back-pressure thereby eliminating the need to compress the fuel above a pressure that is typically available through commercial fuel stations.

Figure 6:
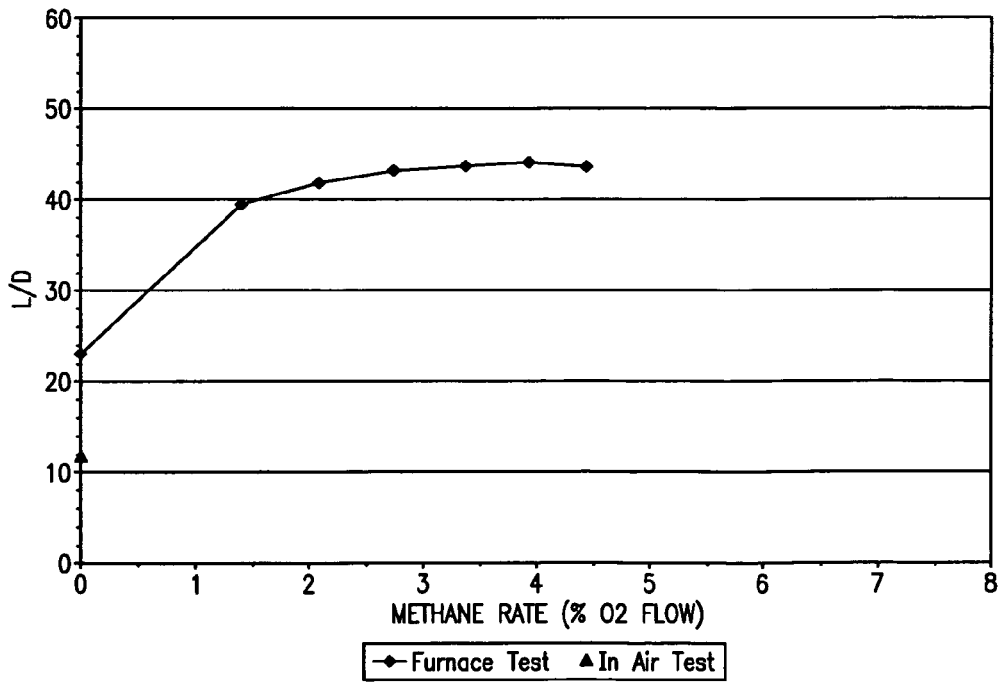
FIG. 6 is a graphical representation of the amount of fuel required to form a flame envelope for a Mach 2 jet of oxygen produced by a nozzle of the type illustrated in FIG. 2 versus the length of the jet while having a supersonic velocity and an axial centerline velocity of about 92 percent of the initial velocity.

With reference to FIG. 6, experiments were conducted to examine the effect of fuel injection rate on supersonic oxygen jet preservation. The methane and oxygen were fed to a nozzle of the type illustrated as nozzle shown in FIG. 2 under the following experimental conditions. The nozzle was operated inside a laboratory furnace apparatus that produced an ambient composed of a mixture of heated and dry (hydrogen free) carbon monoxide (about 70 volume percent) and carbon dioxide (about 30 volume percent) gas at about 3,000° F. ("Furnace Test A"). The converging-diverging nozzle was designed to deliver a fully expanded structured jet with an oxygen flow rate of 4,000 scfh when supplied with 100 psig oxygen. The nozzle had exit and throat diameters of 0.266-in. and 0.203-in., respectively. The overall nozzle length was 0.75-in. and the combined length of the converging and throat sections was 0.203-in. The diameter of the duct upstream of the nozzle was about 0.38-in. Under this supply condition, the jet exits the nozzle at about Mach 2 and about 1,600 fps. The methane was injected into 4 equally spaced drill ports each 0.031-in. diameter and angled with respect to the axis of the main oxygen nozzle by about 42 degrees. The methane was injected into the diverging section of the nozzle at a location that produced an oxygen back-pressure of about 12 psig. Methane was injected into the oxygen stream and varied from 0 to about 4.5 percent of the oxygen flow rate. To supply 2 percent methane, a supply pressure of about 15 psig was required and this resulted in a methane velocity of about 590 fps and about Mach 0.4. A Pitot tube was used to measure the axial centerline stagnation pressure corresponding to an arbitrary distance from the nozzle exit "L". This length was prescribed to correspond to the distance from the nozzle exit at which the jet axial centerline velocity had decayed to about Mach 1.74, which corresponded to a velocity of about 1,470 fps or about 92 percent of the nozzle exit velocity. The measurements were then divided by the nozzle exit diameter, "D", to calculate the parameter "L/D", shown as the ordinate (y-axis) in the graph of FIG. 6. The parameter "L/D" represents a location on the axial jet centerline that is outside of the potential core and inside the supersonic core. As can be seen in FIG. 3, the jet length increases with methane injection rate and achieves about 1.9 times the initial length relative to the heated and reactive ambient and no fuel injection. Also, on the graph of FIG. 6 is the "L/D" measured in ambient air under the same nozzle operating condition.

It is to be noted that experiments have verified that the injection of the fuel in a manner that minimizes the disruption of the oxygen jet (i.e., smooth injection) is the most effective way of producing structured jets that are capable of producing the longest jets for a prescribed flow rate of fuel. In this regard, with reference to FIG. 7, experiments were conducted to examine the effect of fuel injection rate on supersonic oxygen jet preservation with respect to a nozzle of the type shown in FIG. 12. Such nozzle incorporates the injection of fuel through porous metal and results in the least disruption of the oxygen jet due to the injection of fuel. Such experiments were conducted under the following conditions. The nozzle was operated inside a laboratory furnace apparatus that produced an ambient composed of mixtures of heated and dry (hydrogen free) carbon monoxide (about 70 volume percent) and carbon dioxide (about 30 volume percent) gas at about 3,000° F. ("Furnace Test"). All "Furnace Tests" set forth in FIG. 7 were conducted under identical conditions to make certain that the results obtained were accurate and reproducible. The converging-diverging nozzle was designed to deliver a fully expanded structured jet with an oxygen flow rate of 4,000 scfh when supplied with 100 psig oxygen. The nozzle had exit and throat diameters of 0.266-in. and 0.203-in., respectively. The overall nozzle length was 0.75-in. and the combined length of the converging and throat sections was 0.203-in. The diameter of the duct upstream of the nozzle was about 0.38-in. Under this supply condition, the jet exits the nozzle at Mach 2 and 1,600 fps. Methane was injected into the oxygen stream and varied from 0 to about 7.25 percent of the oxygen flow rate. A Pitot tube was used to measure the axial centerline stagnation pressure corresponding to an arbitrary length scale "L" on FIG. 8. The length scale "L" was prescribed to correspond to the distance from the nozzle exit at which the jet axial centerline velocity had decayed to about Mach 1.74, which corresponded to a velocity of 1,470 fps or about 92 percent of the nozzle exit velocity. The measurements were then divided by the nozzle exit diameter, "D", to calculate the parameter "L/D", shown as the ordinate (y-axis) in the graph of FIG. 7. The distance "L/D" represents a location along the axial jet centerline that is outside of the potential core and inside the supersonic core.

Figure 7:
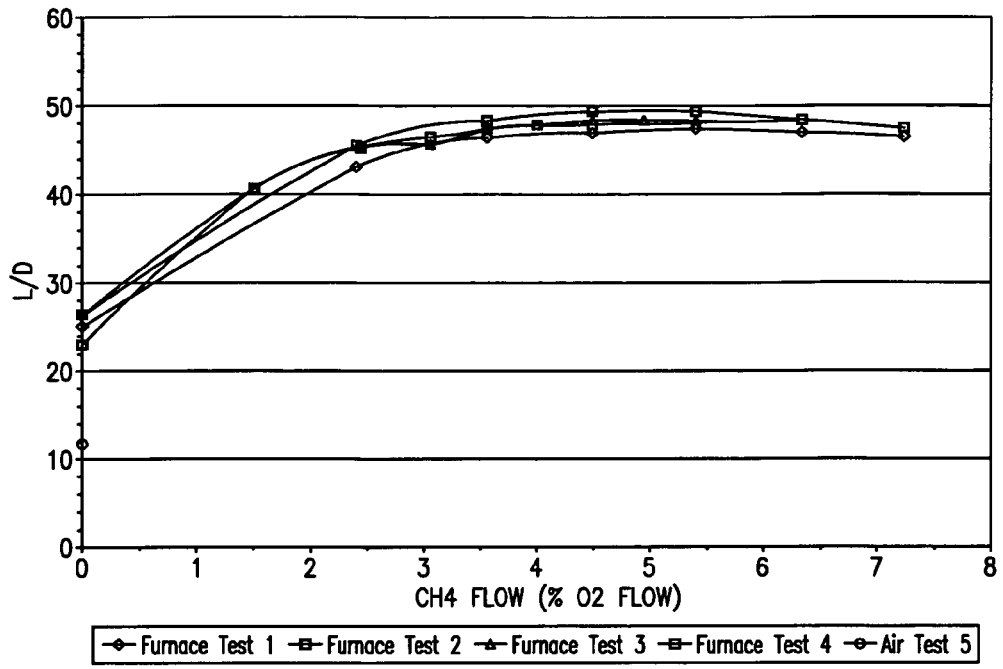
FIG. 7 is a graphical representation of the amount of fuel required to form a flame envelope for a Mach 2 jet of oxygen produced by a nozzle of the type illustrated in FIG. 12 versus the length of the jet while having a supersonic velocity and an axial centerline velocity of about 92 percent of the initial velocity.

As is apparent from FIGS. 6 and 7, the flow of methane has an effect on the length of the jet of oxygen only up to a point of roughly about 5 percent of the oxygen flow. At such point, the addition of further fuel had no effect on the length of the supersonic jet of oxygen. Below about 2.5 percent, the length of the supersonic jet of oxygen was highly sensitive to methane injection rate. Hence, injecting methane between about 2.5 percent and about 5 percent is effective for maximizing the length of the supersonic jet of oxygen. However, as could be appreciated by those skilled in the art, "hydrogen pick-up" caused the injection of hydrogen or hydrocarbons into a steel-containing melt where it is desired to adjust the chemistry of the melt through oxygen addition is undesirable. Hence, in a basic oxygen furnace roughly 1.5 percent methane to about 3 percent methane strikes a medium between the need to extend the length of the jet without injecting unnecessary fuel into the melt.

While the actual flows of fuel and oxygen would vary with nozzle design, the refining requirements, for example, the size of the furnace, and the particular fuel used, it is believed that the results of the foregoing experiments can be generalized when taken with respect to equivalence ratio, that is a ratio of the actual fuel to oxygen being utilized divided by the ratio of the fuel to oxygen required to achieve stoichiometric combustion. In this regard, for an electric arc furnace, the equivalence ratio is preferably between about 0.02 and about 0.14. For a basic oxygen furnace, the equivalence ratio should be between about 0.01 and about 0.06.

A further point is that the nozzle or lance containing the nozzle is preferably positioned with respect to the melt such that the jet of oxygen upon entering the melt is in the supersonic core. More particularly, the jet of oxygen upon entering the melt preferably has a velocity of about 90 percent of the jet velocity upon ejection from the nozzle or nozzles. The nozzle or lance can be positioned at a greater distance and therefore have a lower velocity or a closer distance with respect to the melt to have higher velocity upon entry into the melt. However, the closer the lance is positioned towards the melt, the lower the useful life of the lance. For an electric arc furnace, the data in FIGS. 6 and 7, for the particular nozzle designs and fuel injection, could be used to position the nozzle with respect to the melt. Adjustments would have to made for actual operational conditions, for example, the height of the melt within the furnace. In a BOF furnace there exists a blowing profile that is based upon many known factors in which the position of the lance is changed. Therefore, in case of a BOF furnace, such data would be used as a guide to allow operations in which the jet velocity upon entry to the melt is maximized and such, while for the most part, the jet of oxygen will be in the supersonic core upon entry into the melt, at times, the lance will be positioned so that the jet of oxygen will be beyond the supersonic core. For example if slopping occurs, the lance can be retracted with respect to the melt.

Figure 8:
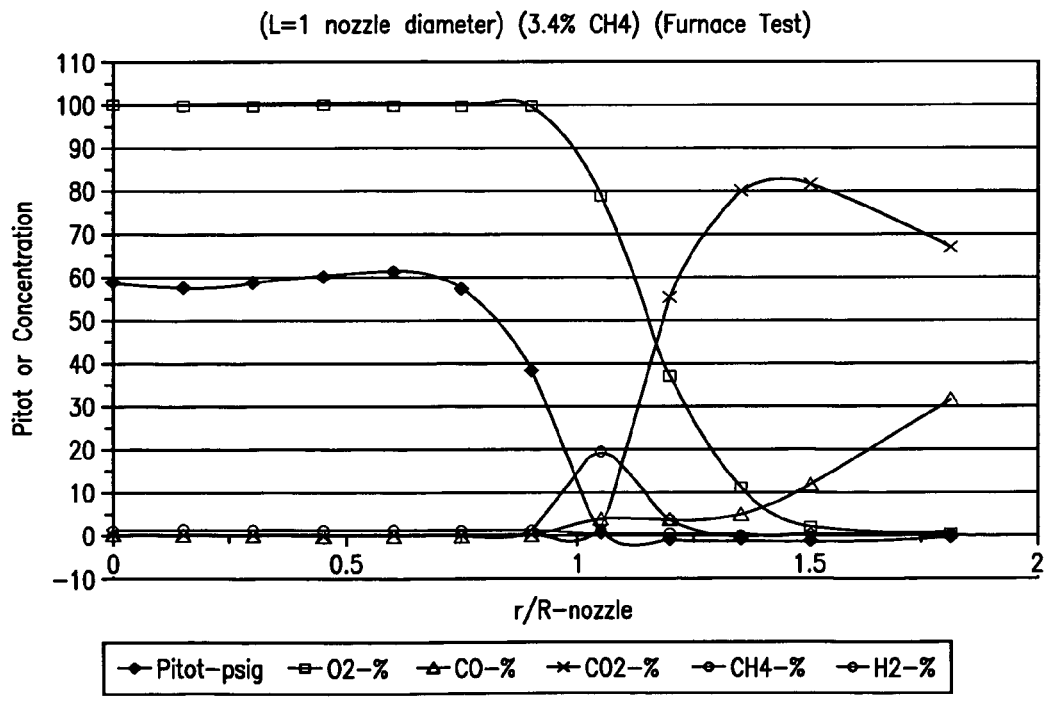
FIG. 8 is a graphical representation of the radial stagnation pressure distribution and gas concentration of a structured Mach 2 jet formed by a method in accordance with the present invention.
Figure 11:
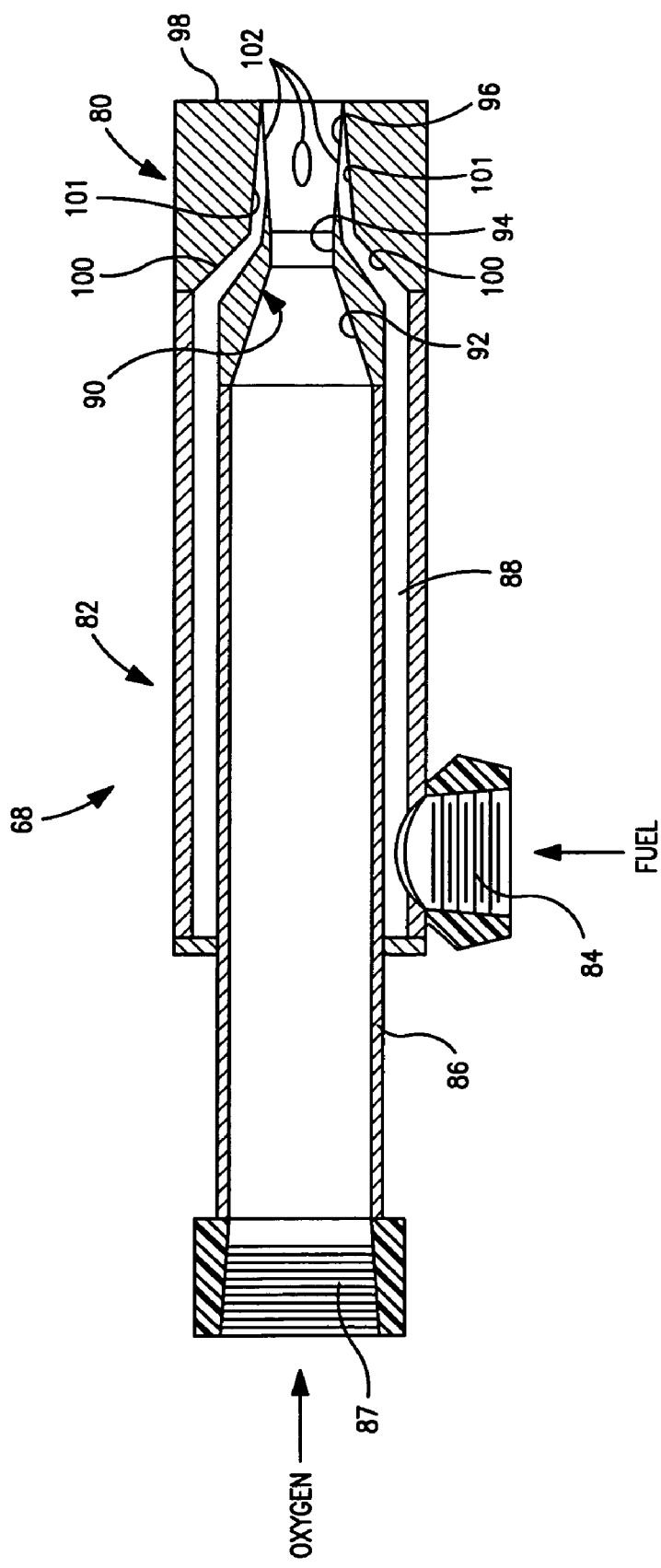
FIG. 11 illustrates the oxygen injector employed in FIG. 9.
Figure 12:
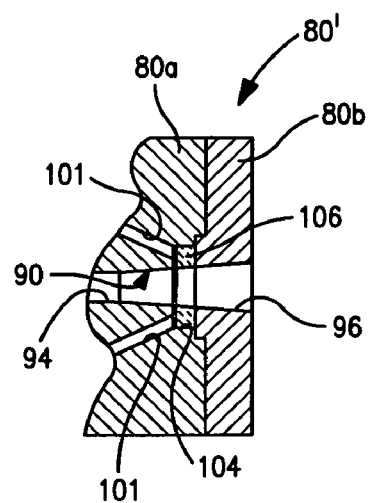
FIG. 12 illustrates an alternative embodiment of the oxygen injector of FIG. 11.

With reference to FIG. 8, the structure of the structured jet is graphically illustrated for a nozzle such as the embodiment shown in FIG. 12 as viewed from the nozzle face at an axial distance of 1 nozzle diameter. For purposes of this experiment, the nozzle was operated inside a laboratory furnace apparatus that can produce an ambient composed of mixtures of heated and dry (hydrogen free) carbon monoxide (approximately about 70 percent by volume) and carbon dioxide (about 30 percent by volume) gas at about 3,000° F. ("Furnace Test"). The converging-diverging nozzle was designed to deliver a fully expanded structured jet with an oxygen flow rate of 4,000 scfh when supplied with 100 psig oxygen. Under this supply condition, the jet exits the nozzle at about Mach 2 and at a velocity of about 1,600 fps. The nozzle had exit and throat diameters of 0.266-in. and 0.203-in., respectively. The overall nozzle length was 0.75-in. and the combined length of the converging and throat sections was 0.203-in. The diameter of the duct upstream of the nozzle was 0.38-in. Methane was injected into the oxygen stream from a porous metal distributor (such as will be discussed below with respect to the embodiment shown in FIG. 11) at a rate of about 3.4 percent of the oxygen flow. A Pitot tube was used to measure the radial stagnation pressure profile of the structured jet. The Pitot tube was also employed as a suction probe and the radial composition profile of the structured jet was also measured. In this way, the local jet stagnation pressure could then be directly compared to the local stream composition. Gas samples were analyzed for oxygen, carbon monoxide, carbon dioxide, methane and hydrogen.

At the outer periphery of the jet, r/R=1 (where "r" is the position of the Pitot tube and "R" is the radius of the outlet of the nozzle at the nozzle face), there exists the greatest concentration of methane indicating the fuel is concentrated at the outer circumferential region of the jet as a mixture of methane and oxygen. This region corresponds to the outer circumferential region 46 of the structured jet 50 shown in FIG. 2. At locations r/R>1, the furnace atmosphere begins to mix with the fuel and oxygen containing mixture at a shear-mixing and reaction zone 52 as indicated by the presence of carbon monoxide and carbon dioxide and also by the decrease in methane and oxygen concentration. Inwardly from the outer periphery of the nozzle, in a direction taken from r/R=1 to the central axis of the nozzle, r/R=0, the oxygen concentration climbs to about 100 percent. No combustion occurs within the nozzle 0<r/R<1 as indicated by the lack of detection of carbon monoxide and carbon dioxide. This region corresponds to the inner central region 56 of the structured jet 50. At the same time, the measured jet stagnation pressure is approaching that expected for a Mach 2 oxygen jet, when taking into account the pressure loss associated with the presence of a shock wave formed upstream of the Pitot tube.

Figure 9:
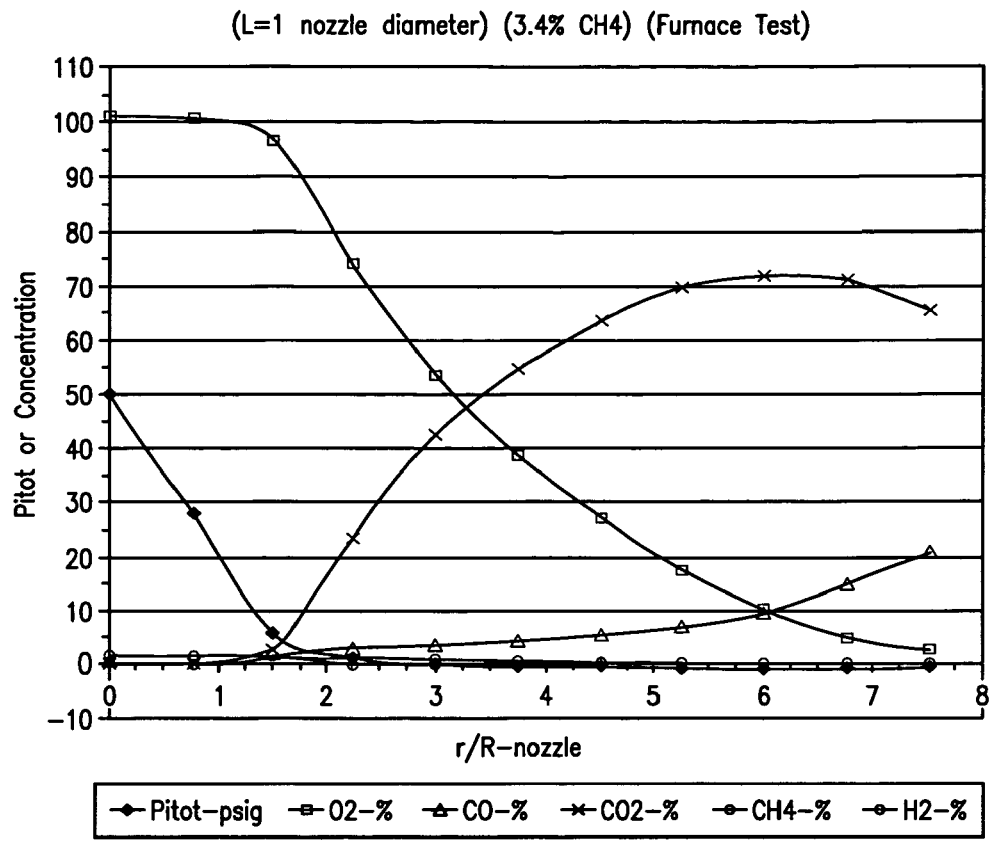
FIG. 9 is a graphical representation of the gas concentration and radial stagnation pressure distribution of a jet of oxygen surrounded by a flame envelope formed by a method in accordance with the present invention that is measured at a distance from the nozzle face at which the axial centerline velocity of the jet has decayed to about 92 percent of the initial Mach 2, 1,600 fps velocity at the nozzle exit.

With reference to FIG. 9, at a greater axial distance, at about 41 nozzle diameters, the centerline stagnation pressure has dropped to about 50 psig at which point the Mach number has decayed to about 1.74 and the velocity has decayed to about 1,470 fps or about 92 percent of the initial jet velocity. At this location, the centerline flow is outside of the potential core and inside the supersonic core. The radial pressure profile can be seen to decay from the central axis of the jet. At about 41 nozzle diameters, the jet is composed mainly of oxygen in the locations about 0<r/R<1.5. As the supersonic jet of oxygen is decelerating, the oxygen jet is diverging as shown by the amount of oxygen detected at radial locations 1.5<r/R<7.5. At such distance from the nozzle exit, there exists very little methane given the fact that the methane has been oxidized, as indicated by the presence of carbon monoxide and carbon dioxide, prior to this point.

Figure 10:
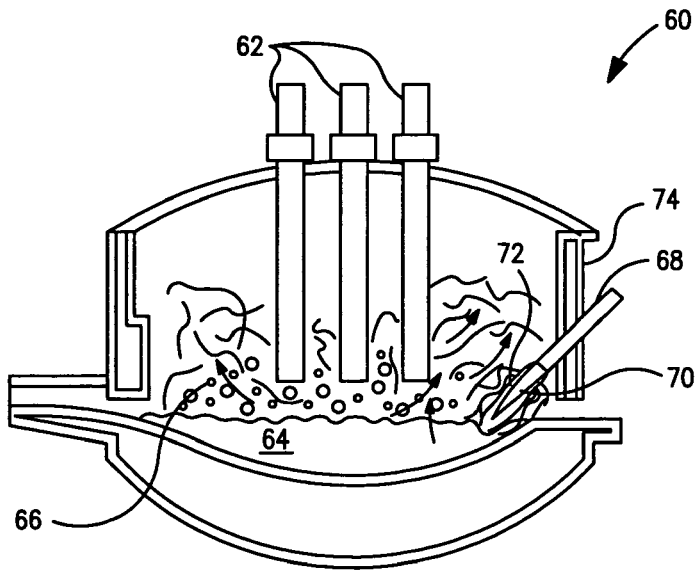
FIG. 10 illustrates a schematic representation of an electric arc furnace employing an oxygen injector to inject a jet of oxygen at a supersonic velocity into a molten metal pool through the use of a method in accordance with a method of the present invention.

With reference to FIG. 10, an electric arc furnace 60 is illustrated that is designed to melt and refine scrap steel. The scrap steel is charged by loading the scrap into electric arc furnace 60 through the top. Carbon electrodes 62 project into the furnace to produce an arc that melts the scrap and heats the resulting molten pool of metal 64.

In iron refining furnaces such as the illustrated electric arc furnace 60 or a basic oxygen furnace to be described hereinafter, the oxygen being introduced into the melt oxidizes a small portion of the iron and the carbon combines with the oxidized iron to produce carbon monoxide. Carbon monoxide is mostly produced by dissolved carbon combining with the oxygen. Some of the carbon monoxide is in turn oxidized to produce carbon dioxide. Carbon monoxide bubbles rise to the surface of the molten pool of metal 64 where they emerge into the slag layer 66. Slag layer 66 forms by oxidation of the impurities and metallic elements in the melt, for example, phosphorus, iron, silicon and manganese, and the dissolution of the resulting oxides with fluxing materials, such as lime and dolomite which are added to the furnace as known in the art. In general, the heated furnace atmosphere overlying the molten pool of metal 64 contains carbon monoxide, carbon dioxide and can have a temperature of between about 2,500° F. and about 3,500° F.

The oxidation of the carbon, carbon monoxide and slag forming elements takes place through oxygen injection by way of an oxygen injector 68 that injects a jet of oxygen 70 having a supersonic velocity into the molten pool of slag and metal 64. As will be discussed, oxygen injector 68 incorporates a nozzle that functions in the same manner as nozzle 2, discussed above, to produce a flame envelope 72 that envelops the jet of oxygen 70 and in fact touches the surface of the molten pool of slag and metal 64. Typically, at the end of the refining process the oxygen gas combined with the carbon within the molten metal bath 64 to produce steel with a desired carbon content and can be less than about 0.02 percent for low carbon steels.

Although not illustrated, but as would be known in the art, oxygen injector 68 is set within a block within a furnace wall 74 that is water cooled. Also, again as not illustrated, a nozzle can be provided for oxygen injection to combine with the carbon monoxide in the heated furnace atmosphere. Carbon particles can also be injected in a manner known from the art to adjust the properties of the slag and further adjust the carbon content of the steel.

With reference to FIG. 11, oxygen injector 68 is illustrated. Oxygen injector 68 is of cylindrical configuration and has a lance tip 80 that is situated at the end of a fuel conduit 82. Preferably lance tip 80 is constructed from copper. Fuel conduit 82 has a fuel inlet 84 for supplying a fuel such as natural gas and as illustrated can incorporate a threaded fitting for attachment to a fuel hose or other conduit for the fuel. Centrally located within fuel conduit 82 is an oxygen conduit 86 having an oxygen inlet 87 for the supply of oxygen. Oxygen inlet 87 can also be in the form of a threaded fitting for attachment to a hose or other conduit for the supply of the oxygen. The fuel flows through an annular space 88 defined between the fuel conduit 82 and the oxygen conduit 86 and the oxygen flows within oxygen conduit to a converging-diverging passageway 90.

Converging-diverging passageway 90 has a converging inlet section 92 formed within the end of oxygen conduit 86, a central throat section 94 and a diverging outlet section 96 that terminates at a nozzle face 98 of lance tip 80. A pressure differential between the supply of the oxygen versus the furnace atmosphere existing at nozzle face 98 is such that a choked flow condition is able to be established within a central throat section 94 of the converging-diverging passageway 90.

The fuel flows from the annular space 88 to fuel passages, each having passage sections 100 and 101 that terminate within diverging outlet section 96 of converging-diverging passageway 90 at inner circumferential locations defined by openings 102 through which the fuel is injected into the oxygen flowing within the diverging outlet section 96. In the specific embodiment there are 4 fuel passages terminating in 4 equally spaced openings 102 as viewed in a transverse direction to nozzle face 98.

It should be pointed out that although lance 68 is illustrated in connection with a electric arc furnace it could also be used in other metallurgical furnaces such as, for example, in non-ferrous smelting and refining vessels.

With reference to FIG. 12, a lance tip 80' is illustrated that constitutes a modification of the lance tip 80 shown in FIG. 11. Lance tip 80' can be formed of two sections 80a and 80b. Although not illustrated, section 80b can be attached to section 80a by way of threaded connectors such as machine screws or by other methods such as welding. Oxygen is fed to the converging-diverging passageway in the same manner as in the injector illustrated in FIG. 11. Further, a passage section 101 fuel to a recess 104 defined within section 80a of annular configuration. Set within the recess 104 is an annular metallic porous element 106 to feed the fuel into diverging outlet section 96 of the converging-diverging passageway 90. The use of such porous metallic elements for fuel injection has a benefit of producing a highly uniform mixture of fuel and oxygen in the outer circumferential region of the structured jet while providing for a method to inject the fuel at low velocity to minimally disrupt the oxygen stream. Such porous metallic elements are also known as porous metals, sintered metals and metallic foams and can be commercially obtained. This manner of injection can be used in any embodiment of the present invention.

Figure 13:
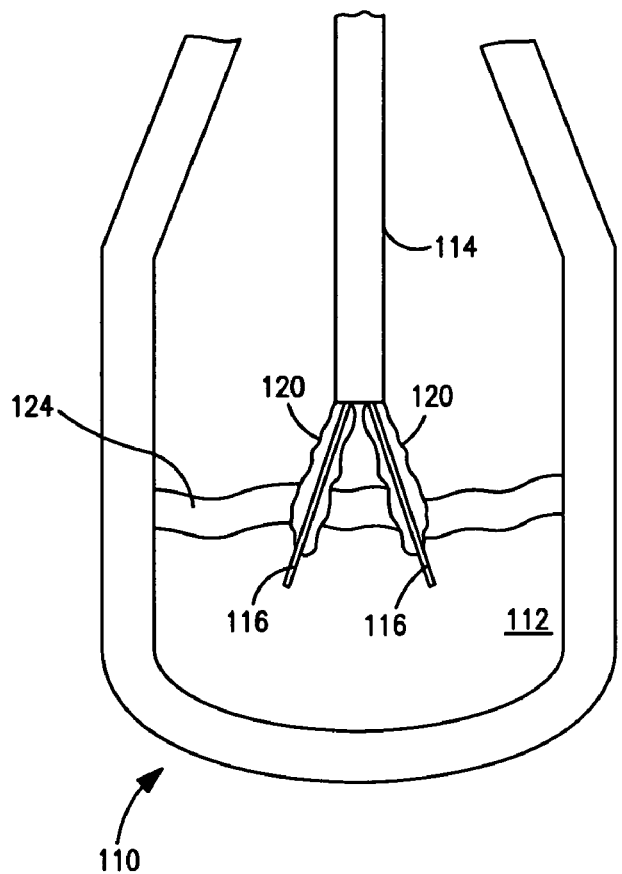
FIG. 13 illustrates a schematic representation of a basic oxygen furnace employing a water-cooled lance to inject jets of oxygen at a supersonic velocity into a molten metal pool through the use of a method in accordance with a method of the present invention.

With reference to FIG. 13, a basic oxygen furnace 110 is illustrated in which iron contained in a molten metal pool 112 is to be refined to steel. A water-cooled lance 114 is provided for such purposes to inject supersonic jets of oxygen 116 into the molten metal pool 112. The jets of oxygen 116 are injected while surrounded by individual flame envelopes 120 that are formed by a method in accordance with the present invention as outlined above.

In the basic oxygen process, molten iron, generally transported from a blast furnace, is charged with scrap into the basic oxygen furnace 110. The jets of oxygen 116 are injected into the furnace for decarburizing hot iron and generating the reaction heat required to melt the scrap. The oxygen oxidizes the carbon, some iron and impurities present within the molten metal pool 112, such as silicon, manganese and phosphorous, to produce a rising slag layer 124.

Figure 14:
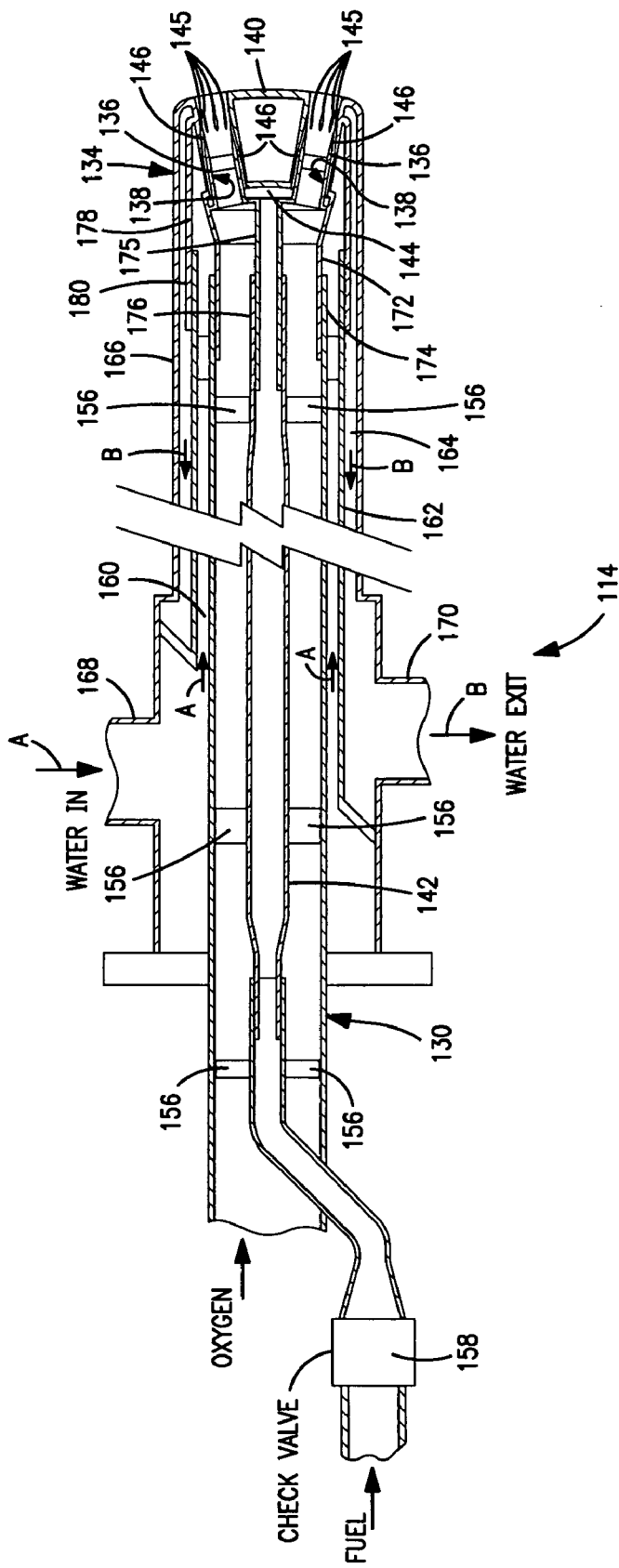
FIG. 14 is a schematic, sectional view of the water-cooled lance employed in FIG. 13.

With reference to FIG. 14, design details of lance 114 are illustrated. It should be pointed out that although lance 114 is illustrated in connection with a basic oxygen furnace it could also be used in other metallurgical furnaces such as, for example, electric arc furnaces, non-ferrous smelting and refining vessels and rotary hearth furnaces. Lance 114 is provided with a central oxygen conduit 130 that extends from an inlet, not shown, to a lance tip 134. The oxygen conduit 130 feeds oxygen to nozzles 136 having converging-diverging passageways 138 that terminate at a nozzle face 140 located in lance tip 134. Coaxially positioned within oxygen conduit 130 is a fuel conduit 142 that terminates at a fuel chamber 144.

Figure 15:
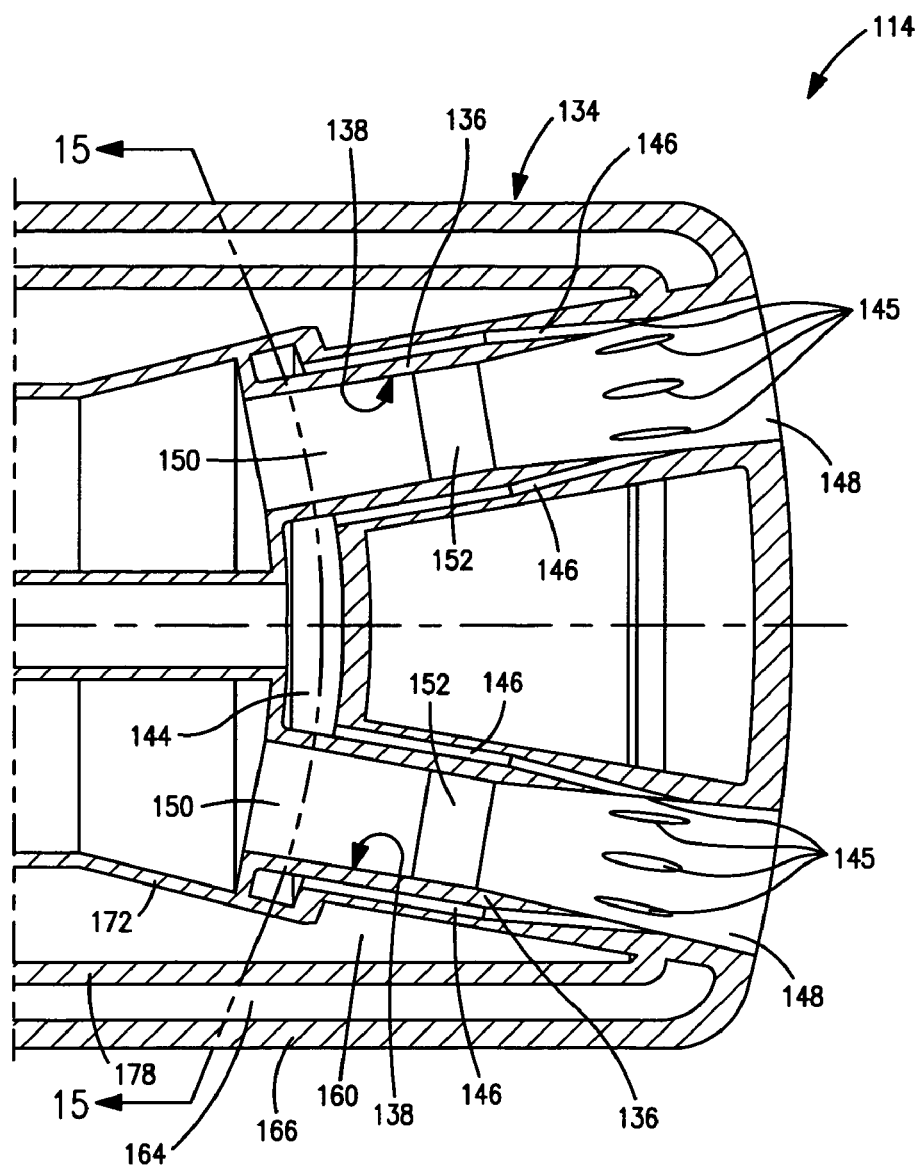
FIG. 15 is an enlarged sectional view of a lance tip of the water-cooled lance illustrated in FIG. 14.
Figure 16:
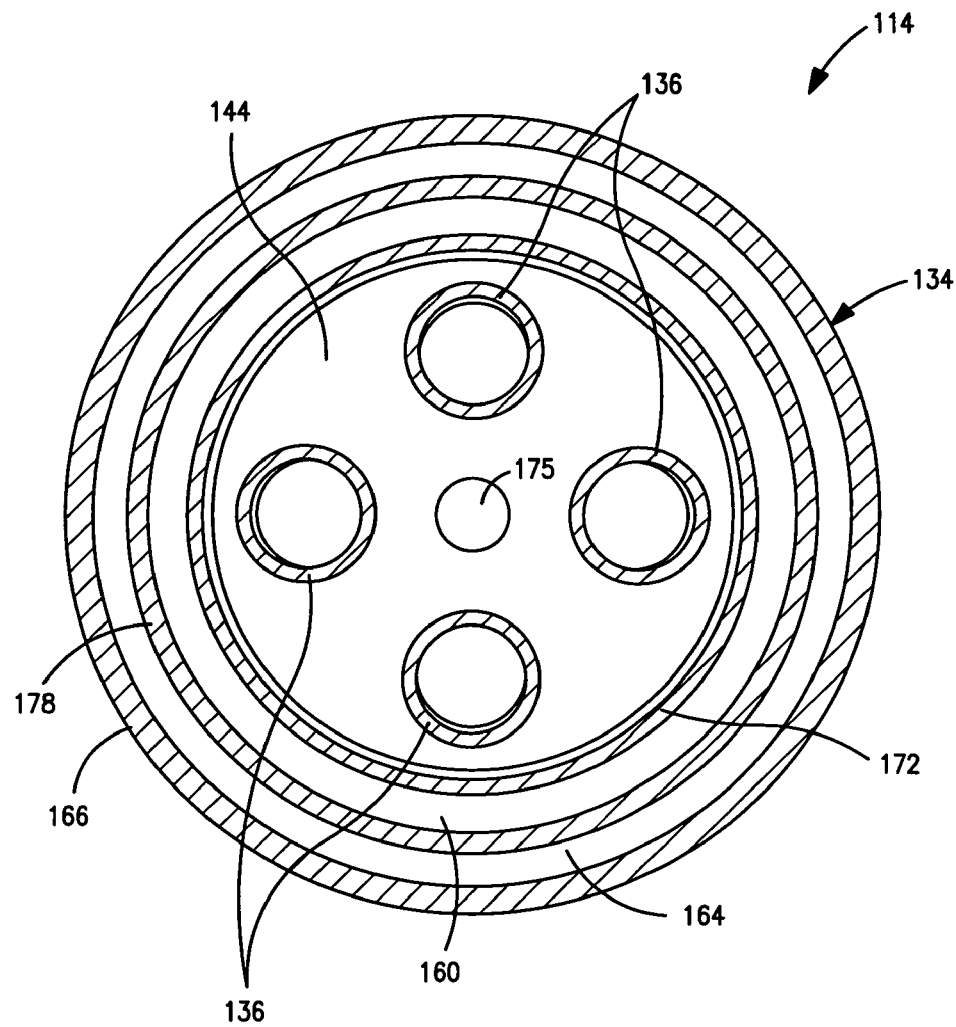
FIG. 16 is a sectional view of FIG. 15 taken along line 15-15 of FIG. 15.

With additional reference to FIGS. 15 and 16, fuel passages 146 communicate between fuel chamber 144 and openings 145 defined within diverging outlet sections 148 of converging-diverging passageways 138 to inject fuel into an oxygen stream accelerated to supersonic velocities within converging-diverging passageways 138. In this regard, each of the converging-diverging passageways 138 have a converging inlet section 150, a central throat section 152 and the diverging outlet section 148 into which the fuel is injected. Openings 145 are therefore the internal circumferential locations for injection of fuel into converging-diverging passageways 138 to form structured jets that interact with the furnace atmosphere in a manner in accordance with the present invention to produce the jets of oxygen 116 surrounded by individual flame envelopes 120. In the illustrated embodiment, since there are 4 nozzles 136, 4 jets of oxygen 116 are produced and surrounded by 4 individual flame envelopes 120.

In the illustrated embodiment there are 8 fuel passages 146 and therefore, 8 openings 145 for each of the nozzles 136. Embodiments of the present invention preferably, however, have between about 4 and about 12 fuel passages for each nozzle. Furthermore, there are 4 nozzles 136 present within lance tip 134. Depending upon the size of the basic oxygen furnace and therefore the size of the lance, typical installations will include between 3 and 6 nozzles. In this regard, the nozzles, again depending upon furnace size will typically be outwardly angled at between about 6 degrees and about 20 degrees from the central axis of the lance. It is possible though to construct a water-cooled lance with a single nozzle such as nozzle 136 to produce a single jet of oxygen and a single flame envelope to inhibit decay of the jet of oxygen.

With added reference to FIG. 13 and with continued reference to FIGS. 14 and 15, fuel conduit 142 is maintained in position by a series of spacer elements 156 that radially extend outwardly from fuel conduit 142 to oxygen conduit 130. A check valve 158 can be provided to prevent back-flow of oxygen into the fuel should there by a failure of the equipment that is used to introduce the fuel into the fuel conduit 142.

Lance 114 is water cooled and is provided with an outer jacket formed by an internal water feed passage 160 defined between a water conduit 162 and the oxygen conduit 130 and a water return passage 164 formed between water conduit 162 and the outer shell 166 of lance 114. Water is fed to lance 114 through water inlet 168 and flows through water feed passage 160 in the direction of arrowhead "A" to water return passageway 164 in the direction of arrowhead "B" after which the water is discharged from water outlet 170.

As can best be seen in FIG. 13, the oxygen conduit 138 is provided with a tip section 172 which is held in place by o-ring type high temperature seals 172. Similarly, fuel conduit 142 is provided with a tip section 175 that is sealed through the remainder of fuel conduit 142 by o-ring seals 176. Likewise, water conduit 162 also has a tip section 178 that is sealed by o-ring seals 180. The sealing arrangement allows removal and replacement of the lance tip 134 that will eventually wear out and need replacement. Preferably and with exception to the porous metallic elements, the components of lance tip 134 are fabricated from copper or copper alloys and assembled together using electron brazing or other joining techniques. The porous metallic elements can be assembled from any metal including steels.

While the invention has been described with reference to a preferred embodiment as will occur to those skilled in the art, numerous changes, additions and omissions can be made without departing from the spirit and scope of the present invention.

We claim:

1. A method of injecting oxygen into melt located within a metallurgical furnace having a heated furnace atmosphere, said method comprising:

introducing an oxygen stream into a nozzle having a passageway of converging-diverging configuration, said configuration including an inlet section, a throat section, and a diverging section;

injecting a fuel containing a hydrogen species into the oxygen stream at inner circumferential locations of the passageway that are situated entirely within the passageway so that a combined fuel and oxygen containing stream is formed within the passageway having a structure composed of an outer circumferential region containing a mixture of the oxygen and the fuel and an inner central region surrounded by the outer circumferential region and containing the oxygen and essentially no fuel;

the oxygen stream being introduced into an inlet section of the passageway at or above a critical pressure, thereby to produce: a choked flow condition within the central throat section of the passageway; acceleration of the combined fuel and oxygen containing stream to a supersonic velocity within a diverging section of the passageway; and discharge of the combined fuel and oxygen containing stream as a structured jet from the nozzle into the furnace atmosphere, the structured jet having the structure of the combined fuel and oxygen containing stream and the supersonic velocity upon discharge from the nozzle;

preventing ignition and combustion of the fuel within the passageway by providing the passageway with an inner surface uninterrupted by any discontinuity within which the outer circumferential region could otherwise decelerate and provide a site for stable combustion of the fuel;

producing a flame envelope surrounding a jet of oxygen formed from the inner central region of the structured jet and initially having the supersonic velocity to inhibit velocity decay and concentration decay of the jet of oxygen, the flame envelope being produced entirely outside of the nozzle through contact of the outer circumferential region of the structured jet with the heated furnace atmosphere so as to create a shear-mixing zone containing a flammable mixture composed of the fuel, the oxygen and the heated furnace atmosphere and autoignition of the flammable mixture through heat supplied by the heated furnace atmosphere; and directing the jet of oxygen into the melt, while surrounded by the flame envelope.

2. The method of claim 1, wherein:

the combined fuel and oxygen containing stream is fully expanded upon discharge thereof as the structured jet from the nozzle; and the fuel is introduced to oxygen stream while within the diverging section of the nozzle.

3. The method of claim 1, wherein:

the combined fuel and oxygen containing stream is over expanded upon the discharge thereof as the structured jet from the nozzle such that the oxygen stream has a sub-ambient pressure while within the diverging section of the nozzle; and the fuel is introduced to oxygen stream at a location within the diverging section at which the oxygen stream is at a sub-ambient pressure.

4. The method of claim 2 or claim 3, wherein the diverging section of the nozzle extends from the central throat section to a nozzle face of the nozzle exposed to the heated furnace atmosphere.

5. The method of claim 1, wherein the supersonic velocity of each of the jets of oxygen is at least about Mach 1.7.

6. The method of claim 1, wherein the metallurgical furnace is an electric arc furnace and the fuel is introduced into the oxygen stream at an equivalence ratio of between about 0.02 and about 0.14.

7. The method of claim 1, wherein the metallurgical furnace is a basic oxygen furnace and the fuel is introduced into the oxygen stream at an equivalence ratio of between about 0.01 and about 0.06.

8. The method of claim 1, wherein the metallurgical furnace is an electric arc furnace or a basic oxygen furnace, the heated furnace atmosphere contains carbon monoxide and the flammable mixture contains the carbon monoxide.

9. The method of claim 1, wherein metallurgical furnace is a basic oxygen furnace and the nozzle is mounted in a water-cooled lance at a lance tip of the water-cooled lance.

10. The method of claim 1, wherein the fuel is introduced into the oxygen stream at the inner circumferential locations of the passageway by injecting the fuel into a porous metal annular element having an inner annular surface forming part of the throat section or the diverging section of the converging-diverging passageway.

11. A method of injecting oxygen into melt located within a metallurgical furnace having a heated furnace atmosphere containing carbon monoxide, said method comprising:

introducing oxygen streams into nozzles having passageways of converging-diverging configuration, said configuration including an inlet section, a throat section, and a diverging section, the nozzles being situated at a tip of a water-cooled lance and angled outwardly from a central axis of the water-cooled lance;

injecting a fuel containing a hydrogen species into the oxygen streams at inner circumferential locations of the passageways that are situated entirely within the passageways so that combined fuel and oxygen containing streams are formed within the passageways, each having a structure composed of an outer circumferential region containing a mixture of the oxygen and the fuel and an inner central region surrounded by the outer circumferential region and containing the oxygen and essentially no fuel;

the oxygen streams being introduced into inlet sections of the passageways at or above a critical pressure, thereby to produce: a choked flow condition within the central throat sections of the passageways; acceleration of the combined fuel and oxygen containing stream to a supersonic velocity within diverging sections of the passageways; and discharge of the combined fuel and oxygen containing streams as structured jets from the nozzles into the furnace atmosphere, the structured jets having the structure of the combined fuel and oxygen containing streams and the supersonic velocity upon discharge from the nozzle;

preventing ignition and combustion of the fuel within the passageways by providing the passageways with an inner surface uninterrupted by any discontinuity within which the outer circumferential region could otherwise decelerate and provide a site for stable combustion of the fuel;

producing flame envelopes surrounding individual jets of oxygen formed from the inner central region of the structured jets and initially having the supersonic velocity to inhibit velocity decay and concentration decay of the jets of oxygen, the flame envelopes being produced entirely outside of the nozzles through contact of the outer circumferential region of the structured jets with the heated furnace atmosphere so as to create a shear-mixing zone containing a flammable mixture composed of the fuel, the oxygen and the heated furnace atmosphere and auto-ignition of the flammable mixture through heat supplied by the heated furnace atmosphere; and situating the water-cooled lance within the metallurgical vessel and directing the jets of oxygen into the melt, while surrounded by the flame envelopes.

12. The method of claim 11, wherein the metallurgical furnace is a basic oxygen furnace.

13. The method of claim 12, wherein there are between 3 and 6 nozzles and the nozzles are outwardly angled at between about 6 degrees and about 20 degrees from the central axis.

14. The method of claim 13, wherein the fuel is introduced into the oxygen stream at an equivalence ratio of between about 0.01 and about 0.06.

15. The method of claim 14, wherein the supersonic velocity of each of the jets of oxygen is at least about Mach 1.7.

16. The method of claim 12 or claim 15, wherein:
the fuel is introduced into a fuel chamber and the nozzles pass through the fuel chamber; and
the fuel is introduced into the passageways through fuel passages located within the lance tip and communicating between the inner circumferential locations of the passageways and the fuel chamber.

17. The method of claim 15, wherein there are between about 4 and about 12 fuel passages for each of the passageways.

* * * * *